Jan. 14, 1930.  G. A. ERICKSON  1,743,763

CUTTING BOARD

Filed April 19, 1928

INVENTOR.
George A. Erickson
BY Thos. E. Derfield
ATTORNEY

Patented Jan. 14, 1930

1,743,763

UNITED STATES PATENT OFFICE

GEORGE A. ERICKSON, OF KANSAS CITY, MISSOURI

CUTTING BOARD

Application filed April 19, 1928. Serial No. 271,173.

This invention relates to improvements in cutting boards, and refers more particularly to an improved type of cutting board adapted to be attached to a steam table, or to any type of table or bench upon which cooked meat is being cut, or from which the sliced meat is being distributed.

Figure 1:
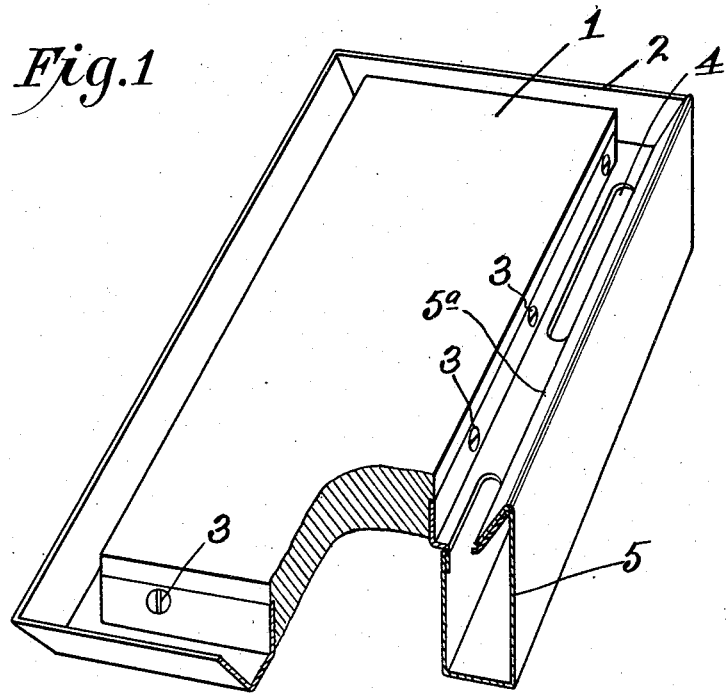
Figure 2:
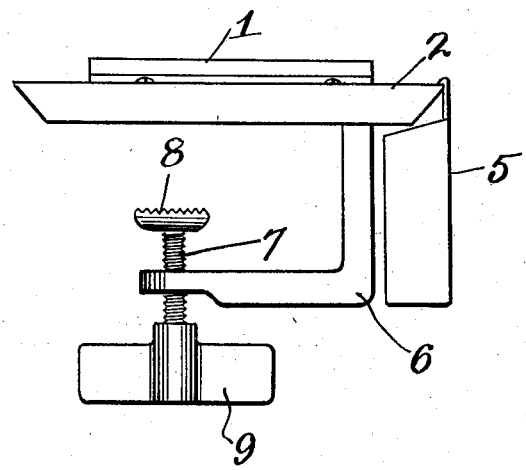

The salient objects are to provide an improved convenient type of steam table cutting board readily attachable and detachable and movable to any desired location. A cutting board which provides for the collection of the meat juices or juices of any material or substance which is cut upon the board, these juices being accumulated into a drip pan, thus eliminating difficulties and disagreeable collection of the juices around the cutting board on the top of the steam table and in adjoining dishes which are being handled from the steam table. In general to provide a construction hereinafter described in detail: Fig. 1 is a perspective top view of the cutting board. Fig. 2 is an end elevational view.

Referring to the drawings, the device consists of a cutting board (1) which is preferably made of wood or other suitable material upon which the meat or other substances to be sliced is placed during the cutting operation. Around the entire circumference of the board is a trough (2) consisting of a turned up metallic strip, one portion of which is affixed by screws (3) to the board (1), while the outer or upturned lip is bent to form the trough surrounding the board. In the bottom of the trough, which extends along one edge of the board are punched, or otherwise formed, holes or elongated apertures (4), through which the juices dripping from the material sliced on the board drip after accumulating in the trough surrounding the board.

Upon that portion of the trough in which the holes (4) are punched is attached a drip pan (5). This drip pan consists of a deep rectangular pan, the front upright portion being somewhat longer than the rear upright side. The front or upright portion of the pan is turned back to form a lip or strip (5ᴬ) and this lip is bent back at an angle corresponding with the angle of the outer edge of the trough. As the angles of the strip or engaging lip (5ᴬ) is substantially identical to the angle to which the trough is bent the drip pan can be detachably affixed to the trough to hang in a vertical position below the trough so that the open top of the drip pan is positioned below the apertures (4) in the bottom of the trough.

It is obvious with the drip pan in this position that juices accumulating in the trough will flow through the aperture (4) into the drip pan and there be collected for removal as desired.

The accumulation of the juices in this manner avoids disagreeable accumulation and collection of juices surrounding the cutting board which is the principal objectionable feature of using a cutting board on a steam table, and necessitates a continued use of an unclean wiping cloth by the cutter, as no provision is made otherwise for the keeping of the top metallic portion of the steam table clean. Small pieces of meat, or other substances, which is being sliced on the board will also accumulate with the juices and will be drained into the drip pan with the juices. In the drawings the rear side of the drip pan is turned back to give a smooth rear top edge to the drip pan, but this is a matter of construction, and forms no part of the novelty of the invention.

The metallic trough and drip pan are preferably constructed of aluminum, or other non-corrosive metals.

Beneath the board is a right angle clamp (6) which is attached near the front of the board, and extends back, terminating in a drilled arm, the drill hole being threaded to receive the friction screw (7). On the upper end of this friction screw is a knurled head (8), and at the lower end is a wing nut (9). In attaching the board to steam table the screw is backed off so that the cutting board rests upon the top of the steam table and the friction screw is in position to be raised by rotation of the wing nut so that the knurled head contacts the lower side of the steam table. One or more of the clamps (6) may be used according to the size of the cutting board. Normally a single clamp will be sufficient to hold the board in position.

In the drawings is shown a particular type of construction, but it is not the intention to limit the invention specifically to the device shown, as it contemplates new type of cutting board having surrounding trough for collecting juices from the board and a detachable drip pan for collecting the juices drained from the trough.

I claim as my invention:

1. A cutting board of the character described, comprising a cutting base, a trough surrounding the cutting base having inclined sides, apertures in the bottom of the trough, a detachable drip pan positioned beneath the apertures in the trough for collecting juices drained from the cutting board one side of the pan bent back to form an engaging surface with one of the inclined sides of the trough.

2. A cutting board of the character described comprising a cutting base, a trough surrounding the base, apertures in the trough, a narrow drip pan substantially the width of the trough and having an extension of one of its sides bent back and adapted to hook over the side of the trough to hold the pan in position and detachably affixed to the trough to collect the juices accumulated in the trough.

3. A cutting board of the character described, comprising a cutting base, a trough surrounding the base, apertures in the trough, a narrow drip pan having one side extended and bent over to form a lip, the lip of the pan adapted to engage the trough and hold the pan in position therebelow, and means integral with the base comprising a right angled member below the base and a clamping screw held by the right angled member for clamping the board to a table.

GEORGE A. ERICKSON.